United States Patent [19]

Labinka

[11] Patent Number: 5,181,812
[45] Date of Patent: Jan. 26, 1993

[54] GUN DRILL MECHANISM

[76] Inventor: Richard T. Labinka, 137 Southwyck, Chagrin Falls, Ohio 44022

[21] Appl. No.: 810,191

[22] Filed: Dec. 19, 1991

[51] Int. Cl.$^5$ ............................................. B23B 47/00
[52] U.S. Cl. ...................................... 408/234; 408/59; 408/67; 408/705
[58] Field of Search ...................... 408/1 R, 56, 57, 59, 408/67, 705, 72 B, 115 B, 24 B, 234; 384/477, 481, 482

[56] References Cited

U.S. PATENT DOCUMENTS

| 3,003,834 | 10/1961 | Pendleton | 384/482 |
| 3,361,014 | 1/1968 | McClennan | 408/705 |
| 3,606,560 | 9/1971 | McClennan | 408/59 |
| 4,726,717 | 2/1988 | Schmid | 408/705 |
| 5,046,868 | 9/1991 | Albert | 384/477 |

FOREIGN PATENT DOCUMENTS

| 330689 | 12/1920 | Fed. Rep. of Germany | 384/477 |
| 3424630 | 1/1986 | Fed. Rep. of Germany | 408/56 |
| 2464775 | 4/1981 | France | 408/59 |
| 2142989 | 1/1985 | United Kingdom | 384/477 |

Primary Examiner—Daniel W. Howell
Attorney, Agent, or Firm—John F. McDevitt

[57] ABSTRACT

Guide means are provided enabling a gun drill to be rotatably mounted in a supported bearing structure for operation with reduced bearing failure. The modified guide assembly provides a more effective seal means by reducing entry of chips and lubricant into the rotating bearing when machining a workpiece.

5 Claims, 2 Drawing Sheets

GUN DRILL MECHANISM

BACKGROUND OF THE INVENTION

This invention pertains to a method and apparatus for more effectively conducting various metal cutting operations with a gun drill and, more particularly, to providing improved seal means reducing bearing failure when operating such apparatus.

Gun drill apparatus of various types have been employed for a considerable time period to carry out various metal cutting operations including the drilling of holes, reaming, chamfering, counterboring and the like. A typical apparatus of this type is described in U.S. Pat. No. 3,361,014 comprising a drill tube formed by a rod having a longitudinal V groove or flute in one side thereof and a drill head, similar in cross sectional configuration to that of the drill rod and slightly larger in diameter which is formed at one end of the drill rod. This configuration is said to provide cutting edges and a passage through which chips may be washed from the workpiece by lubricant fed into the bore with a central passage through the drill rod. Such gun drill is further reported to employ a chip box in connection with the machining operation having one end wall against the face of the workpiece for receiving the chips and lubricant from the drill work and with the opposite end wall having an opening through which the drill rod extends when conducting the selected machining operation. A guide member is further disclosed in said prior art patent for rotatably mounting the gun drill rod in a supported bearing structure with said guide member having a resilient body with an opening therein for receiving the gun drill rod with the opening corresponding in configuration to the drill rod in having normal dimensions slightly smaller than the drill member. The disclosed guide member is said to comprise a cylindrical body of resilient plastic material adapted to be received inside the inner race of an anti-friction bearing and having an irregular central opening therethrough corresponding in form to the cross sectional form of the gun drill rod whereby said gun drill rod may be extended therethrough, the ends of the cylindrical body having radially extending flanges, one of which provides a relatively extensive sealing surface abutting one end face of the anti-friction bearing in which the body is received with the remaining flange at the other end being of substantially less diameter than the first mentioned flange and forming an abutment which engages the opposite end face of the bearing to retain the body inside the bearing race and which flange is deformable to permit insertion thereof through the race for installing or removing the body from the bearing. The particular gun drill apparatus therein disclosed employs a horizontal drill spindle having a chuck thereon for receiving the shank end of the gun drill rod in the usual manner. The spindle moves toward and from the workpiece to advance the drill into the cut bore and to remove it from the workpiece as is well understood in the art. A suitable lubricant is pumped through a passage in the spindle member which further proceeds through an internal passageway formed in the drill rod for lubrication and cooling the workpiece being drilled. The particular guide assembly further therein disclosed is said to be positioned in one end wall of the chip box opposite the end wall having an opening through which the drill rod extends.

A generally similar gun drill apparatus is also disclosed in U.S. Pat. No. 3,606,560 which features modified lubrication passageways being formed in the drill rod member but which is said to correspond to the above described apparatus in other respects. The guide assembly said therein to be employed is expressly said to be that described in U.S. Pat. No. 3,361,014 wherein the radial flanges provided in the resilient guide member at opposite ends do not extend beyond the cooperating bearing device. It has now been found that a more effective seal is needed for such guide assemblies to avert serious damage to the associated bearing when contacted with metal chips and particles formed from the workpiece. In providing more effective sealing of the bearing means in such guide assemblies it becomes further advantageous to do so by means affording still better protection to the plastic guide member itself from wear caused by these abrasive substances. It would be still further advantageous in affording such greater protection to the plastic guide member itself that the means employed also protect against erosion from the heated lubricant or coolant impinging thereon.

It is an object of the present invention, therefore, to provide an improved gun drill apparatus less susceptible to bearing failure caused by customarily encountered operating conditions.

It is another object of the present invention to provide an improved guide assembly for a gun drill apparatus to include more effective seal protection of the cooperating bearing means.

A still further object of the present invention is to provide improved guide means for a gun drill rotatably mounted in a supported bearing structure which more effectively seals the bearing device from abrasive wear while also affording protection against heated lubricant erosion.

Still another object of the present invention is to provide a method for operation of a gun drill apparatus which reduces bearing failure.

These and still other objects of the present invention will become apparent upon considering the following detailed description for the present invention.

SUMMARY OF THE INVENTION

Novel guide means have now been discovered to rotatably mount a gun drill rod in a supported bearing structure which reduces failure of the bearing means caused from exposure to the environmental conditions customarily encountered during operation. More particularly, the presently improved guide means in said supported bearing structure includes a cylindrical body member of resilient organic polymer having a non-round central opening extending therethrough and which further includes radially extending multidiameter flange means at one end which enables a smaller diameter flange portion to engage the bearing end face while a larger diameter flange portion extends beyond to engage the bearing support and thereby provide a more effective seal means reducing bearing failure. In general, the central opening of the cylindrical body member conforms in cross section to the cross section of the drill rod with said drill rod having a groove extending along one side and terminating at one end with a cutting head, the rod further including an internal lubricant passageway which extends to the cutting head. In a preferred embodiment, the outer surface of the larger diameter flange portion for the cylindrical body member is further provided with metal shield means to protect the guide member itself from both abrasive wear as well as further erosion caused by contact with the heated lubricants. In still different preferred embodiments, the present guide means can be physically secured to one end wall of the chip box now conventionally employed in gun drill apparatus while also providing more effective seal protection for other bearing devices similarly being employed to support the drill rod intermediate its ends.

DETAILED DESCRIPTION OF THE PREFERRED EMBODIMENTS

Figure 1:
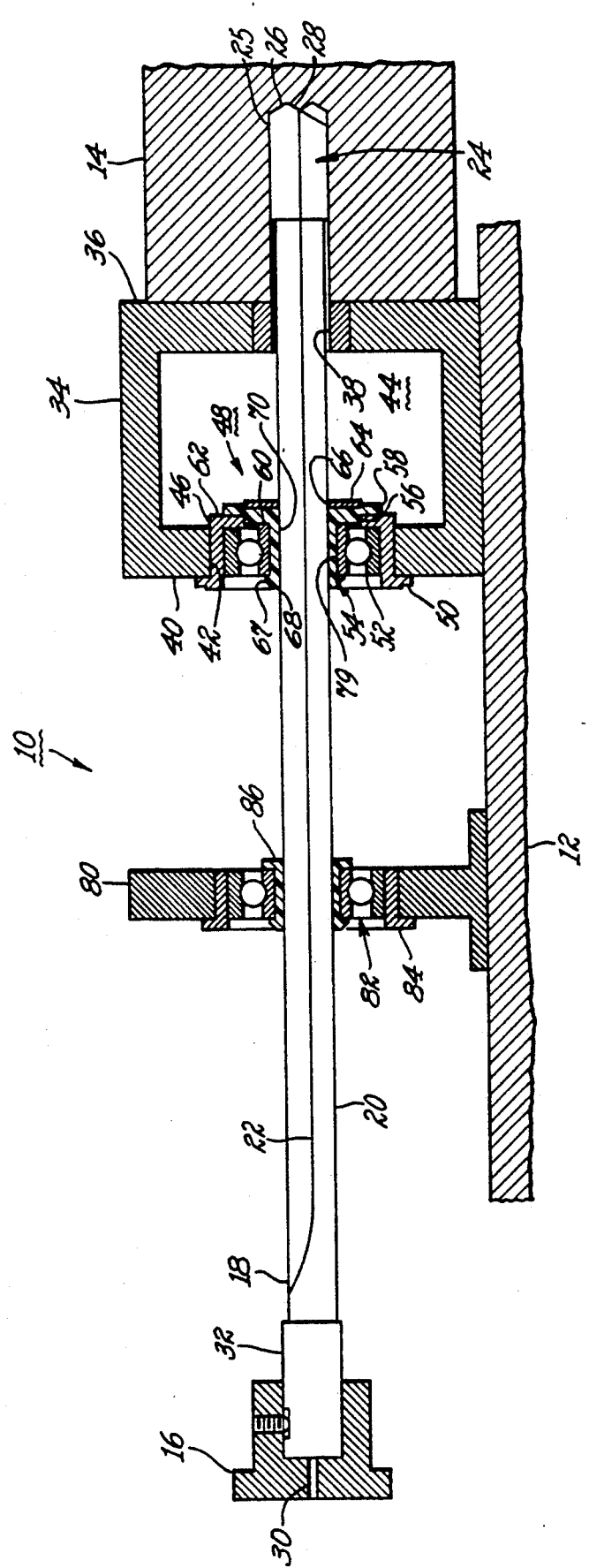
FIG. 1 is a cross sectional view for a representative gun drill apparatus embodiment which includes the improved guide means of the present invention.

Referring to the drawings, there is depicted in FIG. 1 a cross sectional view for a representative gun drill mechanism 10 physically secured in a drilling apparatus 12 enabling various cutting operations to be conducted upon a metal workpiece 14 further secured thereto. A horizontal rotatable spindle 16 having chuck means to secure the shank end of a gun drill rod 18 is mounted in the customary manner further enabling horizontal movement to advance or withdraw the drill rod 18 from the workpiece 14. Drill rod 18 comprises a longitudinally extending cylindrical member 20 having a V-shaped groove or flute 22 on one side thereof which terminates at one end 24 in a cutting head 25 which is slightly larger in diameter than the diameter of said rod. Cutting edges 26 and 28 are provided to the cutting head enabling chips to be removed from the workpiece upon rotation of the drill member. An internal fluid passageway 30 extends from the shank end 32 of the drill rod member to the cutting head enabling lubricant or coolant to be applied to the workpiece when performing various selected metal cutting operations. A conventional chip box 34 is further secured to said drilling apparatus 12 so that one end wall 36 engages the workpiece being machined with a central opening 38 being provided therein for emergence of the drill rod member. Opposite end wall 40 of said chip box includes a similar central opening 42 for passage of the drill rod member to the workpiece. Upon rotation of the drill while being supplied with cutting fluid it can be seen that both metal chips and fluid can thereby be collected in the central cavity 44 of the chip box member.

A supported bearing structure 46 including the improved guide means of the present invention is physically secured to end wall 40 of the chip box for alignment of the drill member rotatably mounted therein to proceed through its central opening 42. The illustrated arrangement serves in the customary manner to properly align said drill member relative to the workpiece while also damping any tendency of said drill member to whip, bow or vibrate when rotated and still further preventing any escape of metal chips and cutting fluid from the chip box. The illustrated guide means 48 of the present invention (see FIG. 2) comprises a cylindrically shaped bushing or adaptor 50 ridgely secured within the central opening 42 of the chip box end wall, a conventional ball bearing device 52 being rotatably mounted in said bushing member and a cylindrical resilient body member 54 having multidiameter flange portions 56 and 58 which are positioned in a particular manner relative to said cooperating ball bearing and bushing or adaptor components. When disposed as shown so that its multidiameter flange end faces inner cavity 44 of the chip box, it will be apparent that an improved seal arrangement is provided with said body member. Both metal chips and cutting fluid are better retained within the chip box by an improved sealing action which further blocks entry of such deleterious substances into the bearing device. In doing so with said radially extending flange means, the smaller diameter flange portion 56 engages an end face 60 of said bearing device whereas larger diameter flange portion 58 extends beyond for cooperating engagement with end face 62 of the bushing or adaptor member 50. Optional protection of the illustrated body member from itself being eroded or worn from impingement of metal chips and/or cutting fluid when the cutting action is performed is provided with a metal shield 64 being affixed to the outer surface of flange portion 58. Such added protection can routinely be provided such as by incorporating such shield means when molding the illustrated body member with a suitable organic polymer material. A central opening 66 in metal shield 64 permits passage of the drill rod member therethrough.

Body member 54 in the illustrated embodiment has an additional radially extending flange portion 67 located at its other end for engagement with opposite end face 68 of the bearing device 52. Such engagement takes place with assembly of the illustrated guide means as further described in connection with FIG. 2. The non-round central opening 70 further provided in said resilient body member is of a conventional configuration for engagement with the drill rod member when the illustrated guide assembly has been completed for operation of the apparatus. Further included ball bearing device 52 can similarly be of conventional configuration having an outer race 72 enclosing a ball-filled inner race 74. Radial grooves 76 provided in both race members enable retention of the ball members 78 therebetween. As can also be seen in the illustrated embodiment, a hollow inside diameter 79 provided in said bearing device enables the resilient body member of the present guide means to be inserted therein. Still other known bearing devices such as roller bearings are deemed suitable in the present guide means, however, since comparable protection thereof would be afforded with the presently improved seal means.

Figure 2:
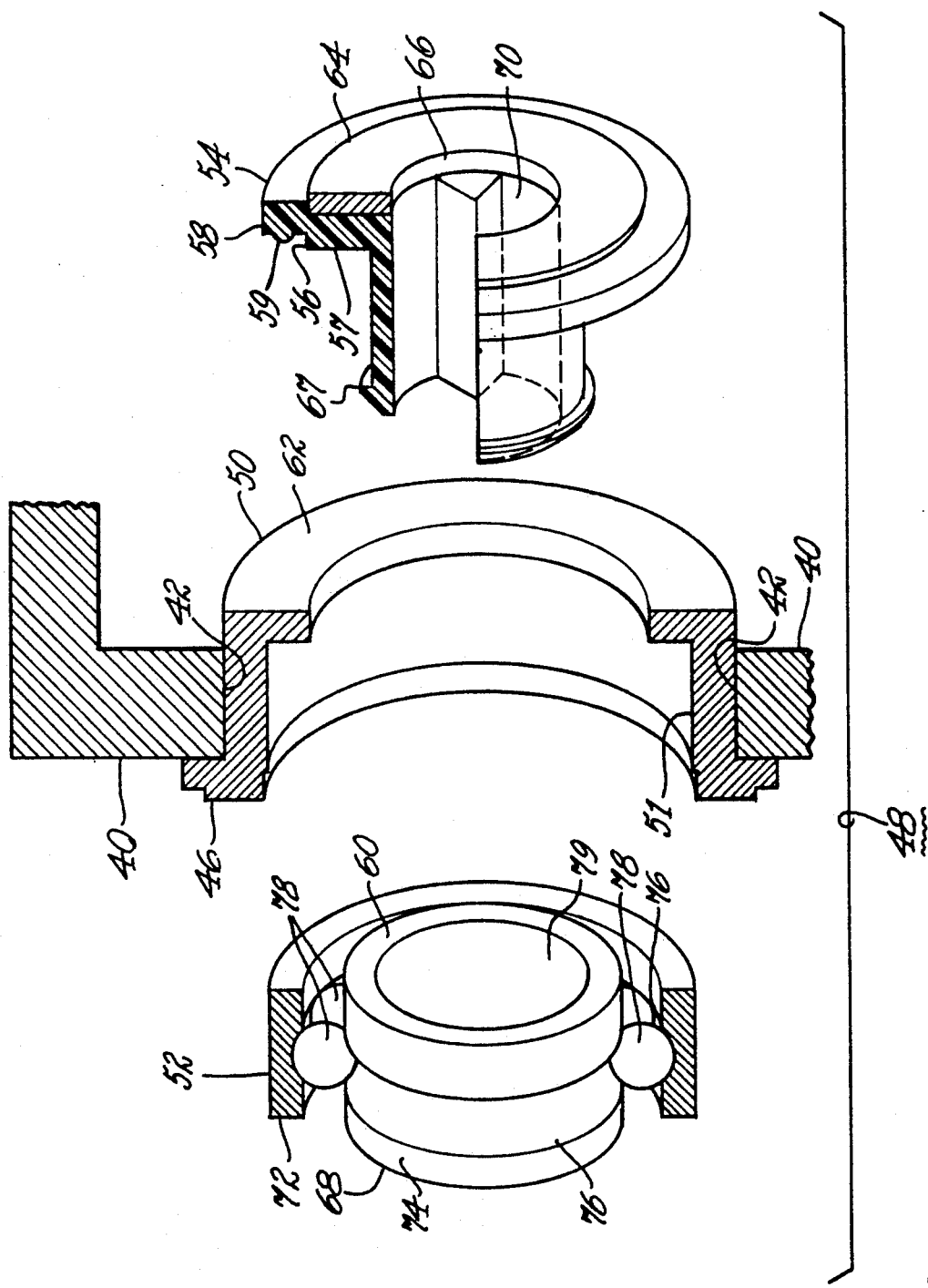
FIG. 2 is an exploded perspective view for a representative guide assembly means in accordance with the present invention before assembly of the component parts.

FIG. 2 provides an exploded perspective view for the above described guide means before assembly of its component parts together. The previously described conventional drill rod member employed with such guide assembly is not included in the present drawing, however, while the same numerals employed in FIG. 1 have been retained to identify common parts in said guide assembly. The illustrated guide means 48 further depicts certain components partially in cross section to provide a still better understanding of the assembled construction. Accordingly, the supported bearing structure 46 is formed with bushing or adaptor member 50 being secured in the central opening 42 of chip box end wall 40. Further rotatably mounted within the central opening 51 of said bushing or adaptor member 50 is the bearing device 52 with its end face 60 being oriented in the same direction as end face 62 of the bushing member, and with both end faces being pointed in the direction of the chip box inner cavity (not shown). Insertion of the resilient body member 54 into the central opening 79 provided in bearing device 52 enables a seal to be formed upon such assembly. A first seal is formed in such manner by physical abutment taking place between lower face 57 of the smaller diameter flange portion 56 provided in body member 54 and upper end face 60 of the bearing device despite its rotation. A second seal engagement results in like manner from physical contact between the lower face seal element 59 of larger diameter flange portion 58 and upper end face 62 of the bushing or adaptor member 50.

Referring back to the apparatus depicted in FIG. 1, it will also be apparent that the herein described guide means can support the drill rod intermediate its ends. More particularly, the interim guide assembly 80 depicted therein similarly includes a bushing member 82 secured in a supported bearing structure 84 with guide means 86 enabling the drill rod to be rotated. It follows that a simple replacement of the conventional resilient body member by the improved body member construction of the present invention will extend bearing life in all such interim support means for the drill rod.

It will be apparent from the foregoing description that broadly useful improved guide means have been provided for a gun drill apparatus extending bearing life. It will also be apparent that modifications can be made in the specific method, apparatus and apparatus components in the above described preferred embodiments without departing from the spirit and scope of the present invention. For example, other physical configurations for the resilient body member but which still include the multidiameter flange portions enabling the same or similar sealing engagement are contemplated. Accordingly, it is intended to limit the present invention only by the scope of the appended claims.

What I claim as new and desire to secure by Letters Patent of the United States is:

1. Guide means for a gun drill rotatably mounted in a supported bearing structure which consists essentially of a cylinder body member of resilient organic polymer having a non-round central opening extending therethrough and which further includes radially extending multidiameter flange means at one end which enables a smaller diameter flange portion to engage the bearing end face by direct physical contact therewith while a larger diameter flange portion extends beyond to engage the end face of the bearing support by direct physical contact therewith and thereby cooperate to provide a more effective seal means reducing bearing failure.

2. The guide means of claim 1 wherein the central opening of the cylindrical body member conforms in cross section to the cross section of the drill.

3. The guide means of claim 1 wherein the supported bearing structure comprises a ball bearing retained within an annular non-rotating support member.

4. The guide means of claim 1 wherein the gun drill comprises a longitudinally extending rod with a groove extending along one side and terminating at one end with a cutting head, the rod further including an internal lubricant passageway which extends to the cutting head.

5. Guide means for a gun drill rotatably mounted in a supported bearing structure, the gun drill comprising a longitudinally extending rod with a groove extending along one side and terminating at one end with a cutting head, the gun drill rod further including an internal lubricant passageway which extends to the cutting head, the supported bearing structure comprising a ball bearing retained within an annular non-rotating support member, and the guide means comprising a cylindrical body member of resilient organic polymer having a non-round central opening conforming in cross section to the cross section of the gun drill rod while further including radially extending multidiameter flange means at one end which enables a smaller diameter flange portion to engage the bearing end face while a larger diameter flange portion extends beyond to engage the bearing support and thereby provide a more effective seal means reducing bearing failure, said guide means being constructed wherein the outer surface of the larger diameter flange portion for the cylindrical body member is further provided with metal shield means.

* * * * *